May 13, 1958  D. RAYNOR  2,834,937
CONDUCTIVITY BRIDGES
Filed June 15, 1955
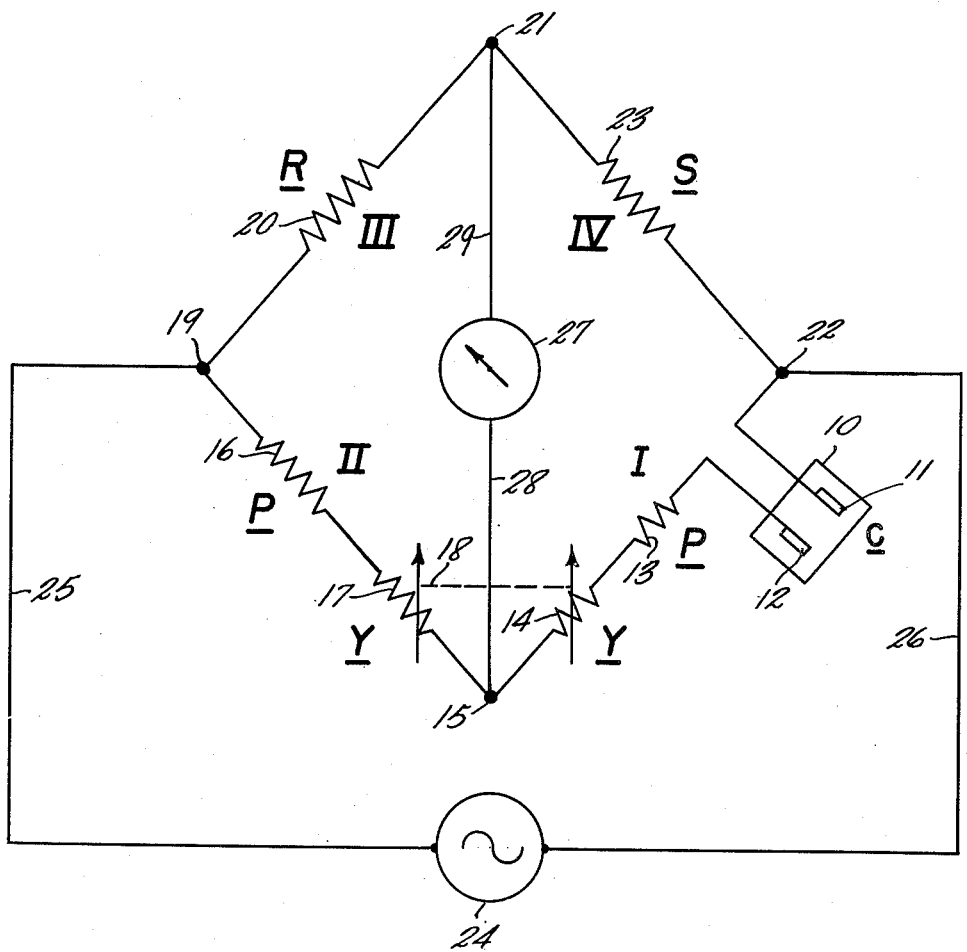
INVENTOR.
DEREK RAYNOR
BY
Campbell, Brumbaugh, Free & Graves
his  ATTORNEYS.

2,834,937

CONDUCTIVITY BRIDGES

Derek Raynor, Goldington, England, assignor to Lever Brothers Company, New York, N. Y., a corporation of Maine Application June 15, 1955, Serial No. 515,728

Claims priority, application Great Britain June 24, 1954

4 Claims. (Cl. 324—30)

This invention relates to bridges for measuring the conductivity of solutions, and has particular reference to temperature compensated conductivity bridges.

The property of electrical conductivity is often used to determine the concentration of solutions. For accuracy, various types of electrical bridges are usually employed to measure this property by means of a conductivity cell connected in one of their arms. However, due to the fact that the conductivity of solutions varies considerably with their temperature, it has been necessary either to determine the temperature at which the conductivity measurement is made and adjust the results accordingly or to provide automatic compensation for the solution temperature. Such automatic compensation systems have suffered from a lack of accuracy when used over a wide temperature range and have been limited in their application to a narrow class of solutions.

Accordingly, it is an object of the present invention to provide a bridge for measuring the conductivity of solutions which automaically compensates for variations in the liquid temperature.

This and further objects of the invention are accomplished by providing a conductivity test cell and temperature controlled resistance in opposite arms of a bridge, variable resistance means adjustable to a reference minimum value being connected in series with the test cell. Similar variable resistance means ganged with the first variable resistance means is connected in another arm of the bridge and the fourth arm contains a resistor of predetermined value. With this arrangement, if the resistance in series with the test cell always bears a fixed relationship to the resistance of the test cell, this relationship being a function of the ratio of the temperature coefficient of conductivity of the solution to the temperature coefficient of resistance of the temperature controlled resistance, the bridge will accurately compensate for temperature variations in the solution being tested by the conductivity cell. Temperature compensation of the bridge is obtained over a range which is a function of the two temperature coefficients and of the values of the bridge components, this range being readily ascertainable in each particular case.

These and further objects and advantages of the present invention will be more readily understood when the following description is read in connection with the accompanying drawing in which the single figure illustrates a schematic circuit diagram of a conductivity bridge in accordance with the present invention.

Referring to the drawing in greater detail, Roman numerals I to IV designate the arms of a conductivity bridge responding to the resistance between electrodes 11 and 12 of a diagrammatically illustrated test cell 10. Thus, the conductivity of solutions to be tested may be determined by the resistance between the electrodes 11 and 12 upon immersion of the cell 10 in a particular solution. A resistor 13 and a variable resistor 14 series connected with the test cell 10 complete the first bridge arm.

The second bridge arm, joined at junction 15 to the first bridge arm, comprises a fixed resistor 16, series connected with a variable resistor 17, these resistors preferably corresponding to the resistors 13 and 14 found in the first bridge arm. A suitable mechanical connection 18 between the variable resistors 14 and 17 permits their simultaneous adjustment through the same range of values. Although the resistors 13 and 14 preferably correspond to the resistors 16 and 17, it will be understood from the nature of the bridge circuit, as discussed in further detail below, that the total resistance in arm I must bear a constant ratio to the total resistance in arm II throughout their adjustment range. Of course, since a unity ratio simplifies the bridge, it is the preferred value.

A junction 19 connects the second arm to the third bridge arm which carries a temperature controlled resistance positioned to be subjected to the temperature of the solution being tested by the cell 10. For example the temperature controlled resistance 20 may comprise the resistance element of a resistance thermometer, this element being located in a sheath forming one of the electrodes of the test cell 10. Various known test cells providing this and similar arrangements may be employed in the present bridge.

To complete the bridge, the third and fourth arms form a junction 21 and the fourth and first arms form a junction 22, a fixed resistor 23 being connected between these two junctions.

The bridge is energized by connecting a power source 24 through conductors 25 and 26 to junctions 19 and 22, respectively, the source 24 preferably supplying alternating current at a frequency of from 50 cycles per second to 5 kilocycles per second. However, it will be understood that other power sources including direct current may be suitable in certain instances.

An appropriate voltage responsive meter 27 connected through conductors 28 and 29 to the remaining junctions 15 and 21, respectively, indicates unbalance of the bridge. Of course, the source 24 and meter 27 connections may be reversed as is well known in this art.

To compensate for variations in solution temperature with this conductivity bridge, it has been determined that the resistance in series with the test cell 10 must always bear a fixed relationship to its resistance. Accordingly, there must always be some resistance in series with the test cell 10, which always presents a finite resistance, in order to provide temperature compensation and, consequently, some corresponding resistance in the second bridge arm to balance the bridge. This has been achieved in the present instance by placing the preset resistors 13 and 16 in series with the variable resistors 14 and 17 but it will be understood that the same function may be achieved by limiting the variable resistors 14 and 17 to some reference minimum value.

To aid in understanding the present invention, the bridge components have also been designated by letters on the drawing to clarify certain equations set forth hereinafter. For example, C represents the resistance of the test cell 10 and P represents the resistance of the resistor 13.

In order to provide the bridge with components having suitable values, it is necessary to calculate the magnitude of P, the minimum value of resistance in series with the test cell 10, and this may be accomplished by the use of the relationship $$P = \left(\frac{\alpha}{\beta} - 1\right) C_{min} \qquad (1)$$

where $C_{min}$ is the minimum value of resistance presented by the test cell 10 at the normal operating temperature, $\alpha$ is the temperature coefficient of conductivity of the solution and $\beta$ is the temperature coefficient of resistance of the temperature controlled resistance 20. Equation 1 clearly shows that the temperature coefficient of conductivity of the tested solution must be greater than the temperature coefficient of resistance of the temperature controlled resistance 20.

With the value of P determined from Equation 1, the magnitude of the resistor 23 may be calculated by relating the bridge arms in the equation:

$$\frac{R}{S} = \frac{P}{P + C_{min}} \quad (2)$$

With the foregoing values determined, the highest measurable resistance of the test cell 10, $C_{max}$, may be ascertained from the equation:

$$\frac{R}{S} = \frac{P + Y_{max}}{P + C_{max} + Y_{max}} \quad (3)$$

where the values of R and $C_{max}$ are those at the normal operating temperature. Conversely, Equation 3 may be used to calculate the value of $Y_{max}$ corresponding to a desired value of $C_{max}$.

In a bridge constructed in accordance with the principles of the present invention, a platinum resistance thermometer element was employed for the temperature controlled resistance 20 and had a value of 140 ohms at 20° C. and a temperature coefficient $\beta$ of 0.5 ohms/° C. Since the value of $\alpha$ in the solutions being tested was 1.0, the value of $$\frac{\alpha}{\beta} = 2$$

$C_{min}$=50 ohms and $Y_{max}$=500 ohms. With a normal working temperature of 80° C., the magnitude of the resistance thermometer element 20 was 170 ohms. Therefore, the values of P, S and $C_{max}$ for the normal working temperature of 80° C. were 50 ohms, 340 ohms and 550 ohms, respectively.

In a similar arrangement in which the value of $$\frac{\alpha}{\beta} = 3$$

the calculated values of P, S and $C_{max}$ were 100 ohms, 255 ohms and 300 ohms, respectively. It will be understood that these values of the bridge components are set forth only for purposes of illustration and should not be construed as limiting the invention in any respects.

It will be apparent that temperature compensation of the bridge is provided by an element which provides a resistance which is theoretically a linear function of the temperature of the solution in which the test cell 10 is immersed. However, in practice the temperature coefficient of resistance of temperature controlled resistances such as resistance thermometer elements may not be truly constant. For example, the temperature coefficient of resistance $\beta$ of the platinum resistance element employed in the first illustrative examples set forth above was 0.514 ohm/° C. at 0° C. and 0.492 ohm/° C. at 150° C. Accordingly, minor adjustments of the resistors 13, 16 and 23 may be made in order to give the best temperature compensation over the required temperature range. In a typical application of the present conductivity bridge, the concentration calibration was maintained ±1% over a temperature range of 40° C., i. e. from 40° C. to 80° C.

It will be understood that the above-described embodiment of the invention is illustrative only and modifications thereof will occur to those skilled in the art. Therefore, the invention is not to be limited to specific apparatus disclosed herein but is to be defined by the appended claims.

I claim:
1. A temperature compensated bridge for measuring the conductivity of variable temperature solutions comprising four arms, a test cell connected in the first arm adapted to be immersed in a solution and provide a resistance which is a function of the solution characteristics, first resistance means variable to a reference minimum value in series with the test cell in the first arm, second variable resistance means in the second bridge arm joined to the first arm, means for simultaneously varying the first and second resistances through the same range of values, temperature controlled resistance means having a temperature coefficient of resistance less than the temperature coefficient of conductivity of the solution being tested, said temperature controlled resistance means being disposed in the third bridge arm joined to the second arm and being adapted to be maintained at the temperature of the solution tested by the cell, third resistance means having a reference value connected in the fourth bridge arm between the first and third arms, a detector connected between two opposite junctions each formed by conjugate bridge arms, the remaining two opposite junctions being adapted to be connected to a power source.

2. A temperature compensated bridge for measuring the conductivity of variable temperature solutions comprising four arms, a test cell connected in the first arm adapted to be immersed in a solution and provide a resistance which is a function of the solution characteristics, first resistance means variable to a reference minimum value P in series with the test cell in the first arm, second variable resistance means in the second bridge arm joined to the first arm, means for simultaneously varying the first and second resistances through the same range of values, temperature controlled resistance means disposed in the third bridge arm joined to the second arm and adapted to be maintained at the temperature of the solution, third resistance means having a reference value connected in the foutrh bridge arm between the first and third arms, the reference minimum value P of the first resistance means being substantially in accordance with the equation $$P = \left(\frac{\alpha}{\beta} - 1\right) C_{min}$$

wherein $\alpha$ is the temperature coefficient of conductivity of the solution being tested, $\beta$ is the temperature coefficient of resistance of the temperature controlled resistance means and $C_{min}$ is the minimum value of resistance of the test cell at the normal operating temperature, and a detector connected between the two opposite junctions each formed by conjugate bridge arms, the remaining two opposite junctions being adapted to be connected to a power source.

3. A conductivity bridge comprising four serially connected arms, a resistor connected in the first arm, a test cell connected in series with first variable resistance means in the second arm, second variable resistor means mechanically ganged to the first variable resistance means in the third arm, a resistance thermometer in the fourth arm, the resistance of the first variable resistance means bearing a constant ratio to the resistance of the second variable resistance means.

4. A conductivity bridge as defined in claim 3 in which the ratio is unity.

References Cited in the file of this patent
UNITED STATES PATENTS 2,370,609  Wilson et al. _____ Feb. 27, 1945
2,541,857  Besselman et al. _____ Feb. 13, 1951